PHASE SENSITIVE SWITCHING ELEMENT

Filed Oct. 25, 1963 2 Sheets-Sheet 1

INVENTOR.
ANDREW FRANCIS DEMING
BY
Fay & Fay
ATTORNEYS

INVENTOR.
ANDREW FRANCIS DEMING
BY
Fay & Fay
ATTORNEYS 3,313,952
PHASE SENSITIVE SWITCHING ELEMENT
Andrew F. Deming, Sebring, Ohio, assignor to Consolidated Electronics Industries Corporation, Alliance, Ohio, a corporation of Delaware
Filed Oct. 25, 1963, Ser. No. 318,856
6 Claims. (Cl. 307—88.5)

This invention relates generally to electronic circuits, and more particularly to a phase sensitive electronic switching element utilizing semi-conductors and to systems including such elements.

It is an object of this invention to provide a new and improved phase sensitive circuit element.

It is another object of this invention to provide in a single unitary circuit element means for sensing and amplifying a signal having a predetermined phase with respect to a second signal.

It is still another object of this invention to provide a phase sensitive signal amplifying element which is efficient, expeditious and economical.

It is a further object of this invention to provide a turn-on switching and amplifying element which is responsive to either of first or second differing phase signals, to control a load in either of first or second conditions.

It is an additional object of this invention to provide a novel semi-conductor gating element which is responsive to signal phase reversals to control a load current in accordance therewith.

It is still a further object of this invention to provide a novel phase discriminating semi-conductor device which is effective to actuate either of two different circuit paths in accordance with the phase of the input signals applied thereto.

In accordance with a broad feature of this invention, phase sensitivity is achieved by way of a four-layer semi-conductor device wherein one of the outer layers is bisected.

Another feature of the invention relates to a body of semi-conductor characteristics having alternate occurring zones of opposite conductivity and means for applying electrical signals in phase opposition to each other simultaneously to physically separated portions of an outer layer thereof, and accordingly resulting in a current flow through a predetermined circuit path.

Another feature of this invention pertains to a semi-conductor body comprising successive zones of material of opposite conductivity type, each separated from the other by an electrical junction, one of the layers thereof being split, to thereby produce a pair of physically separated outer elements.

The above and additional objects and features of this invention will be more fully appreciated from the following detailed description when read with reference to the accompanying drawings, in which.

Figures 1, 2:
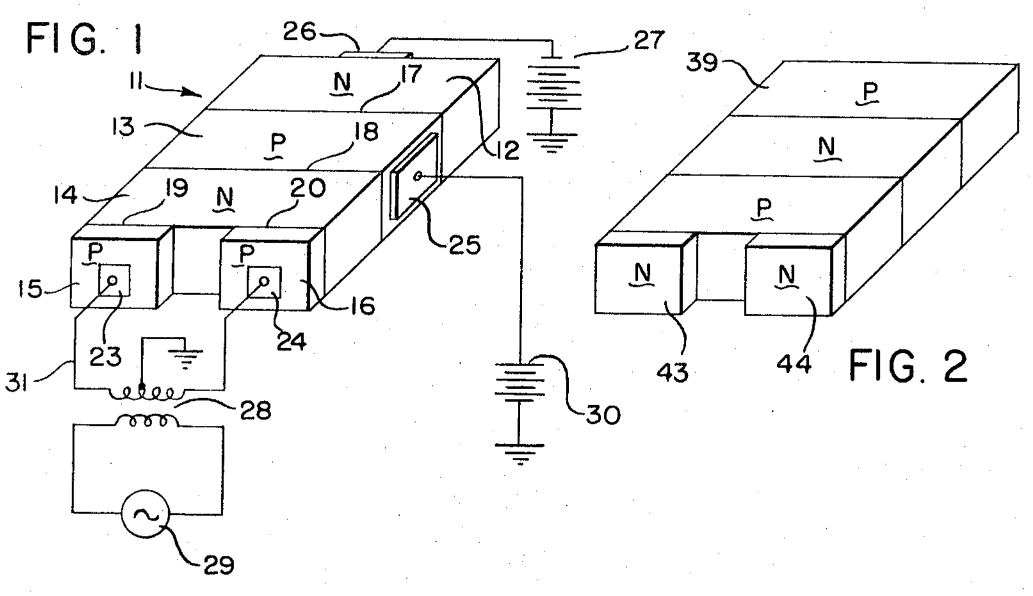
FIG. 1 shows a perspective view of one embodiment of the invention.
FIG. 2 shows a perspective view of another embodiment of the invention.

As is known and fully treated, for example, in Crystal

Rectifiers by H. C. Torrey and C. A. Whitner, volume 15 of the M. I. T. Radiation Laboratories Series, there are two kinds of semi-conduction, referred to as intrinsic and extrinsic. I, for the most part, will be concerned with the extrinsic mode; however, both types are contemplated within the scope of this invention. It is also well known that in semi-conductors there are two types of carriers of electricity which differ in the signs of the effective mobile charges. The negative carriers are excess electrons which are free to move, and are denoted by the term "conduction electrons" or simply "electrons." The positive carriers are missing or defect "electrons" and are denoted by the term "holes." Accordingly, the conductivity of a semi-conductor is called excess or defect, or respectively N- or P-type, depending on whether the mobile charges normally present in the material under equilibrium conditions are electrons (negative carriers) or holes (positive carriers).

Furthermore, the terms N-type and P-type are applied to semi-conductive materials which tend to pass current easily when the material is negative or positive with respect to a conductive connection thereto and with difficulty when the reverse is true.

Again, as is more thoroughly explained in available literature, the term "impurities" is here used to denote those impurities which affect the electrical characteristics of the material such as its resistivity, photo-sensitivity, rectification, etc. It has been established that small amounts of impurities, such as phosphorous in silicon, and antimony and arsenic in germanium, are termed "donor" impurities because they contribute to the conductivity of the basic material by donating electrons to an unfilled conduction energy band in the basic material. The donated negative electrons in that case constitute the carriers of current and the material and its conductivity are said to be of the N-type. On the other hand, small amounts of other impurities such as, for example, boron in silicon or aluminum in germanium, are termed "acceptor" impurities because they contribute to the conductivity by "accepting" electrons from the atoms of the basic material in the filled bands. The resulting current flow in materials having acceptor type impurities is characterized as a movement of these positive "holes" and accordingly its conductivity is said to be of the P-type. The actual methods of preparing the N- and P-type materials is not pertinent to this invention, and any of the many well known methods and procedures may be utilized.

The term "junction" as used in this description and in the discussion of circuits may be defined as the surface separating two parts of a semi-conductor with different conductivity. Junction type transistors may be defined in terms of junctions as being a structure having two junctions in close proximity of each other so that there is interaction therebetween.

The techniques for forming junctions may be subdivided into two basic types, impurity contact and grown junctions. Generally speaking, the impurity contact method involves treating a homogenous crystalline wafer with impurities to generate the different properties which form the junction; whereas the grown junction technique involves incorporating into the crystal during its growth the impurities necessary to produce junctions. Included within the types of transistors made by the impurity contact process are alloy transistors, surface barrier transistors, and transistors using surface diffusion. Rate grown, melt back, and grown diffused transistors are examples of the grown process for forming junctions. For a more detailed explanation of these methods the reader is referred to any of the many textbooks which treat transistor construction techniques in more detail, such as the G. E. Transistor Manual, fifth edition, pages 12–24. Suffice it to say that for our purposes any of the many well known techniques for forming junctions may be utilized in forming my four-layer device having a split outer zone.

Accordingly, by using any of the well known junction forming techniques, a device as shown in FIGS. 1 or 2 can be made. The embodiment in FIG. 1 comprises a body or block of semi-conductive material, such as silicon or germanium, having a layer or zone 13 of P-type material interposed between two layers or zones 12 and 14 of N-type material, which also may be of semi-conductive material, such as silicon. The zones 12, 13, and 14 are accordingly arranged to form successive contiguous zones of opposite conductivity type. Lastly, along either outer surface of N-type zone 12 or 14 will be formed two, physically separated from each other, P-type layers 15 and 16. It should, of course, be appreciated that the well known impurity contact method of forming junctions may be utilized to diffuse onto either outer zone two additional zones or sections with each of the diffused zones being of a conductivity type opposite to that of the outer zone. Accordingly, an element having electrically isolated paths through either zone 15 or 16 of FIG. 1 will result.

The structure may, of course, have been formed in the manner of FIG. 2, which has a similar layer structure as FIG. 1, but in which corresponding layers are of opposite conductivity type.

As an alternative, my four-layer structure, having a split outer layer, may be formed from commercially available silicon control rectifiers or four-layer diodes. The outer P-type layer, if a structure as FIG. 1 is desired, or the outer N-type layer, if a structure as shown in FIG. 2 is desired, is then bisected by use of a diamond saw, etching, or other methods known in the art.

Regarding the operating characteristics of the element 11, it can be seen that in reality there are two four-layer units, one made up of layers 12, 13, 14, and 15, and the other made up of layers 12, 13, 14, and 16. Each unit comprises successive contiguous zones of opposite conductivity type. The unit made up of layers 12 through 15 includes rectifying junctions 17 through 19, whereas, the unit consisting of layers 12, 13, 14, and 16 includes rectifying junctions 17, 18, and 20. Further, the operating leads may be attached to the unit by way of tabs 23 through 26, which may be gold-antimony plated tabs, or by any other well known way of making non-rectifying contact thereto.

As is shown in FIG. 1, merely for purposes of illustration, an alternating voltage 29 is connected by way of the secondary of transformer 28 and tabs 23 and 24, respectively, to the split P-type layers 15 and 16. Accordingly, depending upon the phase of the alternating signal 29, one P layer, let us say 15, the anode of the unit comprising layers 12 through 15, will be forwardly biased for half of the alternating cycle, while the other anode, 16, will be forwardly biased for the other half of the cycle. At the same time, a negative or ground bias is established on the emitter of unit 11, the N conductivity layer 12, by way of battery 27, and a battery 30 is utilized to apply a positive biasing potential to P-type material 13. Assuming that all of the junctions (17 through 20) are not broken down, it is found that the short circuit current flow through the unit can be expressed as:

$$\frac{I_{CO}}{1=(\alpha 1+\alpha 2)}$$

where, $I_{CO}$ is the reverse saturation current that junction 18 would have if junctions 17, 19, and 20 were short circuited by non-injecting connections; $\alpha 1$ is the inherent alpha of P zone 13; and $\alpha 2$ is the inherent alpha of N zone 14.

From the above, it can be appreciated that if $\alpha 1+\alpha 2$ is equal to 0.9, the current flow through unit 11 will be equal to ten times the leakage current. Also, since the leakage current in a PN junction can be made very small, the total current will also be made very small. This condition, then, will represent the "off" condition of the unit. However, if $\alpha 1+\alpha 2$ is made approximately equal to 1, then it is seen that the current flow through the unit will be limited only by the circuitry external thereto. This latter condition will represent the "on" condition.

There are two basic mechanisms which may be used for increasing the alphas of the inner zone in order to turn unit 11 to its "on" state. One method involves increasing the unit current gain alpha, as a result of an avalanche breakdown, due to a significant increase in the collector, 15 or 16, to emitter, 12, voltage. The other scheme takes into account that most silicon semi-conductors have special impurity centers and therefore have low alphas at low emitter current, and that the alphas thereof can be rapidly increased by increasing the emitter current. The typical way of increasing the emitter current, and thus increasing alpha, is to introduce a current at the base of unit 11.

Once element 11 is turned on, it will continue to conduct with only a minimum of voltage applied between the collector, 15 or 16, and the emitter 12, hereafter referred to as $V_{CE}$. The amount of voltage necessary after conduction is initiated is dependent upon the amount necessary to maintain a sustaining current flow therethrough. However, if the $V_{CE}$ is lowered beyond the minimum sustaining value the unit returns to its high impedance "off" state, and remains in that state until it is turned "on" again. Therefore, in the crude system shown in FIG. 1, a current will be injected into the base zone 13 at the same time that a negative or ground signal is being applied to the emitter zone 11. This results in the $\alpha 1+\alpha 2$ of the unit approaching unity. Concurrently therewith, in accordance with the phase relationship of the alternating signal from source 29, and the phase connection provided by transformer 28, one of the anodes, let us assume it is 15, will be provided with a forwardly biased voltage; whereas the other anode, 16, will have a negative bias applied thereto. Under the above conditions, a current will be flowing through the lead 31 which is connected in circuit with anode 15, but virtually no current will be flowing through the circuit including anode 16. This condition persists for so long as the positive forward biasing signal is available at anode 15, and upon a change in phase, on the next half of the alternating cycle, a forward biasing signal is available at anode 16 to result in a current flow through the circuit connected thereto. It should, of course, be appreciated that a variable phase signal may be applied to the base 13 instead of voltage source 30, and in which case condition of the unit would only be possible upon a concurrency of positive signals at emitter 13 and either anode 15 or 16. In the above manner, it is seen that I have formed a phase sensitive circuit element which results in a current flow through a predetermined circuit in accordance with the signal having a first phase, and a current flow through a second circuit if the signal is of a second phase.

It should be noted, at this point, that the change in phase of the signal at anode 15 and 16 not only results in the shifting of the conducting path, but also in reducing the sustaining voltage across the previously conducting portion of unit 11 to below the critical level and accordingly results in a cutting off thereof. Therefore, depending upon a current being injected into base zone 13 and upon which of the anodes 15 or 16 has a positive potential applied thereto will establish which anode circuit will have a resulting current establised therein.

FIG. 2 illustrates a four-layer device having split cathode elements 43 and 44 and a unitary anode zone 39 in place of the split anode elements 15 and 16 with the unitary cathode 12 of FIG. 1. In principle, the device operates the same as the phase sensitive device of FIG. 1 and accordingly details of explanation will not be set forth.

Figure 3:
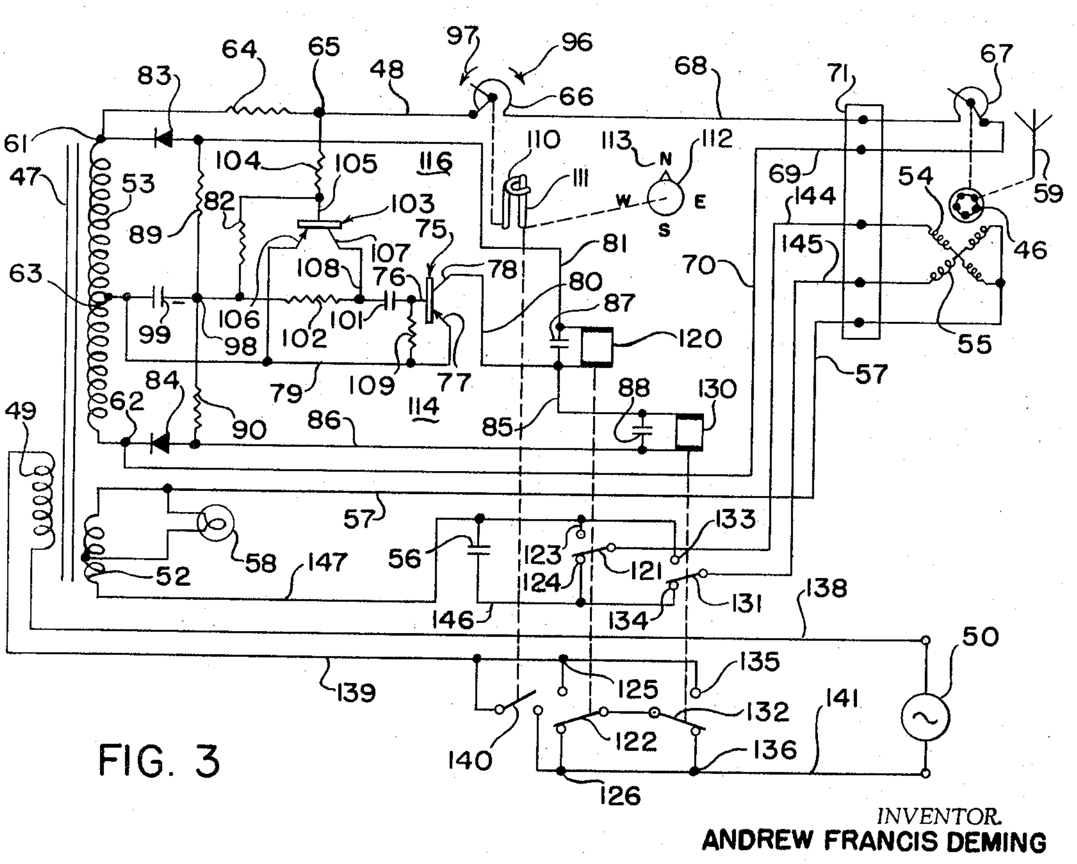
FIG. 3 shows an electrical circuit diagram made up of conventional circuit components with the resulting complexity of circuitry and elements.
Figure 4:
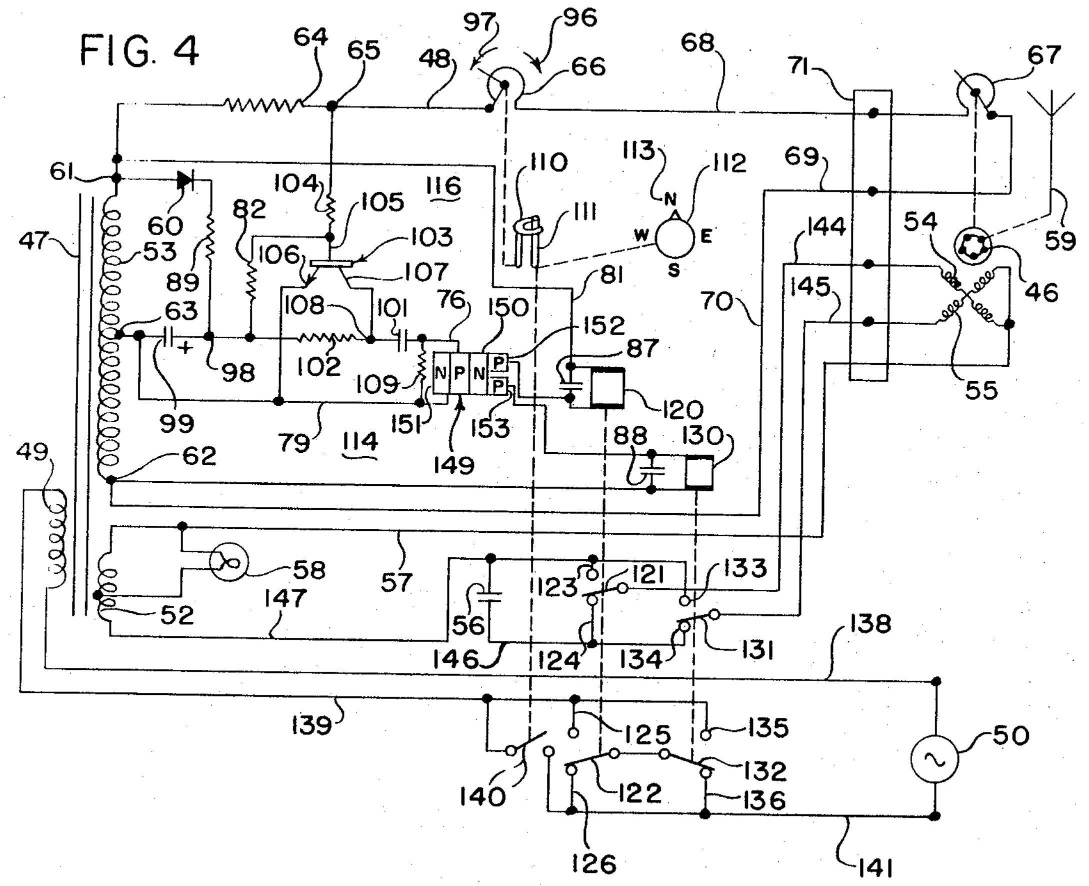
FIG. 4 shows in electrical circuit schematic fashion the same circuit as FIG. 3 utilizing my new circuit element and the resulting saving in components and circuit connections attributable thereto.

For the purpose of facilitating the explanation and to show the reader the difference in complexity and number of circuit elements for a similar application, reference is made first to FIG. 3 which illustrates the prior art circuitry necessary for remotely controlling an automatic antenna rotor. FIG. 4 illustrates a circuit to achieve the same result as that of FIG. 3, but with the attendant reduction in elements and complexity resulting from the use of my unique phase sensitive circuit element.

The circuit of FIG. 3 shows a phase sensitive circuit 114 used to control a motor 46. The circuit of FIG. 3 includes, generally, a transformer 47 energizing the motor 46 and additionally a bridge circuit 48 and an amplifier circuit 116. The transformer 47 including the primary 49 is energized from an alternating voltage source 50 through first manual switch contacts 140. The transformer has first and second secondaries 52 and 53 with the first secondary 52 energizing a pilot lamp 58 and connected to energize motor windings 54 and 55. A conductor 57 leads from the secondary 52 to a common terminal of the motor windings 54 and 55 and a conductor 147 extends from the other end of the secondary 52 to one end of capacitor 56, which provides lagging or leading phase current to motor winding 55 relative to motor winding 54, to upper contacts 123 and 133 of relays 120 and 130, respectively. The other end of capacitor 56 is connected to the other terminals, 124 and 134, of relays 120 and 130, respectively. Further, relay 120 operated switch blade 121, shown to be normally making its associated lower contact 124, is connected by way of lead 144 to winding 54. Lastly, relay operated contact blade 131, shown to be making, in its unoperative state contact 134, is returned to winding 55 by way of lead 145. Accordingly, in a manner to be more fully described hereinafter, depending upon the phase of the alternating signal as applied to secondary winding 53 in relation to the phase of the signal signal, the rotor of the induction motor 46 may be rotated selectively in either direction to rotate an antenna 59 as representative of a load.

The bridge circuit 48 is energized from end terminals 61 and 62 by the transformer secondary 53, which secondary also has a mid-tap 63. The bridge circuit 48 includes a first impedance 64, an output terminal 65, and first and second potentiometers 66 and 67 connected in series by the wires 68 and 69 across the end terminals 61 and 62. Thus, the first impedance 64 is a first leg of the alternating current bridge 48 and the first and second potentiometers 66 and 67 connected in series by conductors 68 and 69 constitute the second leg of the bridge. The two halves of the secondary 53 may be considered as a voltage source of the bridge, plus the third and fourth legs of the bridge as well. The mid-tap 63 is, thus, the second output terminal of this bridge. All five conductors 57, 68, 69, 144, and 145 may pass through a terminal strip 71 and thus it will be seen that the antenna rotator or load motor 46 may be remotely connected to the phase sensitive circuit 114 by a five conductor cable.

Voltage is supplied to the primary winding 49 of transformer 47 by the alternating source 50. Specifically, conductor 138 connects one end of the primary winding 49 to one terminal of alternating source 50. The other terminal of primary winding 49 is connected to manual switch blade 140, which is operated indirectly by the operator through lost motion device 110 and adjustable potentiometer 66, to the upper terminal 125, associated with the second switch blade of double pole double throw relay 120, and to the upper terminal 135, associated with blade 132 of double pole double throw relay 130. The lower terminals 126 and 136 of relays 120 and 130, respectively, and the terminal of manual switch 140 are then connected to the other terminal of alternating source 50 by way of lead 141. Accordingly, as will be explained in more detail later, it is necessary that one of these switches be operated in order to complete the circuit to the primary winding for energization of secondaries 52 and 53 of transformer 47.

The bridge output terminals 63 and 65 supply a phase sensitive input signals to a common amplifier, in this case shown as a transistor 75, as a part of the amplifier circuit 116. The motor 46 is a load responsive to two different phase conditions for bidirectional movement in accordance with predetermined phases, and is controlled through the relay 120 and relay 130.

The transistor 75 has a base 76, an emitter 77, and a collector 78. The emitter 77 is connected by a conductor 79 to the mid-tap 63. The collector 78 is connected by a conductor 80, through the coil of the relay 120, a conductor 81, and through a first diode 83 to the first end terminal 61. The collector 78 is also connected through the conductor 80, the conductor 85, the other relay coil 130, and through a second diode 84 to the end terminal 62. Filter capacitors 87 and 88 are connected across the coils of relays 120 and 130, respectively, to prevent chattering of the contacts thereof.

The first and second diodes 83 and 84 supply a D.-C. voltage by means of filter resistors 89 and 90 connected in series across the anodes thereof. The junction 98 between the resistors 89 and 90 is connected through a filter capacitor 99 to the mid-tap 63. The polarity of the diodes 83 and 84 makes the junction terminal 98 negative relative to the mid-tap 63. The base 76 of the transistor 75 is connected through a coupling capacitor 101 and a resistor 102 to the terminal 98.

A transistor preamplifier 103 may be provided in the amplifier circuit 116 for added sensitivity. Although such preamplifier may be omitted where coarse control is sufficient or where an impedance matching transformer is used. The bridge output terminal 65 is connected through a current limiting resistor 104 to the base 105 of the transistor 103, and the emitter 106 thereof is connected to the mid-tap 63, which is the other output terminal of the bridge. Accordingly, the bridge output is applied to the input electrodes of the transistor 103. The collector 107 of the transistor 103 is connected to the terminal 108 at the junction of capacitor 101 and resistor 102. Accordingly, the output circuit of the transistor 103 may be traced from the positive D.-C. source terminal 63 through the emitter 106, the collector 107 and resistor 102 back to the D.-C. negative source terminal 98. Therefore, resistor 102 is the load resistor of the preamplifier transistor 103 and is the source of input signals supplied through the coupling capacitor 101 to the main transistor amplifier 75.

The relay 120 actuates relay switch blades 121 and 122, which in their unoperated state makes contacts 124 and 126, respectively, to maintain the transformer 47 energized after actuation thereof. Relay 130 is operable in accordance with the phase of the alternating current source across secondary winding 53 to operate its associated switch blades 131 and 132 from normal connection with terminals 134 and 136, respectively, to terminals 133 and 135 upon energization thereof. The first potentiometer 66 may be the control potentiometer, and is but one example of the variable impedance which may be employed to control the phase of the input signals. The selectively adjustable blade of this first potentiometer 66, which is moved by a lost motion means depicted as a yoke 110 and a pin 111 therebetween, controls the initial closing of manual switch 140. A manual control knob 112 adjusts the selectively positioned arm of potentiometer 66 by way of lost motion means 110 through 111. The knob 112 may co-opearte with a scale or other indicia 113 to indicate the desired amount of rotation or direction of rotation of the motor driven antenna 59. The lost motion means 110–111 may take on any of the many well known forms. Movement of the knob 112 first takes up the lost motion and then moves the movable blade of the potentiometer 66, and also momentarily closes switch 140. The closing of switch 140, which remains closed for only a predetermined interval after the release of manual control knob 112, results in the application of alternating voltage source 50 to primary winding 49.

Lastly, before explaining the operation of the circuit, it should be understood that an antenna selection position, by knob 112, which decreases the amount of resistance provided by the second bridge arm by selectively adjustable potentiometer 66, will result in a wave form at bridge output point 65 having a phase relationship, as shown, by the left-most wave form 5–B, relative to the wave form 5–A, which is developed across secondary winding 53 from terminal 62 to 61. Whereas an increase of resistance in the second bridge arm, by moving the selectively positionable tap of potentiometer 66 in the direction indicated by arrow 97 will result in a signal, as shown, by the right-most wave form of FIG. 5–B being developed at point 65 relative to terminal 62. Accordingly, let us assume that a clockwise movement of potentiometer 66 has resulted and accordingly the resistance thereof will be decreased to result in a decrease in the impedance of the second arm of the bridge, which includes potentiometers 46 and 47. Accordingly, the alternating current bridge 48 will have an output voltage developed across terminals 63 and 65. This output voltage will either be in phase with the voltage from mid-point 63 to terminal 61 or from mid-tap 63 to terminal 62. As explained above, we are assuming that a decrease in the resistance of potentiometer 66 will result in an out of phase signal as shown by comparison of the left-most wave forms 5–B and 5–A. Therefore, when terminal 61 goes positive the output terminal 65 will go negative because this output signal is directly out of phase with the voltage from terminals 62 to 61. Thus, in the first half cycle, when terminal 61 is positive, terminal 65 will be going negative. This applies a negative bias to the base 105 of transistor 103 causing this transistor to increase conduction through the load resistor 102. This transistor current is shown in the left-most portion of FIG. 5–C, labeled curve 93. The terminal 108 thus becomes increasingly positive on the first half cycle, and hence, the transistor 75 is biased into complete non-conduction.

A bias resistor 82 is connected between the base 105 of transistor 103 and terminal 98. This provides a small leakage current so that transistor 103 is biased into a partial conducting region. A self-biasing resistor 109 is connected between the base 76 and emitter 77 of transistor 75, with transistor 75 accordingly being normally biased in a substantially non-conducting state.

During the next half cycle of reference voltage 91, however, the bridge output voltage at terminal 65 is going positive, and this decreases the conduction of transistor 103 to make terminal 108 less positive or more negative. This increasing negative voltage swings is applied through the coupling capacitor 101 to the base 76 of transistor 75, hence, biasing it into a conducting state. The current through the main transistor 75 is shown in the left-most wave form of FIG. 5–D, labeled as curve 94. Accordingly, a half wave pulse of current 94 is passed by the transistor 75 in the second half cycle of the reference voltage 91. This pulse of current passes through the collector 78 of transistor 75, but cannot flow to the terminal 62 because at this time the alternating voltage developed across secondary winding 53 makes point 62 positive, and this positive voltage results in a back biasing potential being applied to the cathode of diode 84. However, the current flowing through collector 78 of transistor 75 can flow through relay coil 120 because point 61 of secondary winding 53 will be negative at this time to accordingly bias diode 83 in a forwardly direction. This, of course, results in an energization of relay coil 120. Capacitor 87 smoothes the half wave pulses developed across relay coil 120 to maintain energization thereof and pull in the relay blades 121 and 122 against the contacts 123 and 125, respectively. The closing of blade 122 against contact 125 establishes an energization circuit for the primary 49 through conductor 141, relay blade 132, relay blade 122, contact 125, conductor 139, and thence back to the primary 49 and return through conductor 138. The closing of relay blade 121 against contact 123 establishes an energization circuit for the motor 46 from the secondary 52. This energization circuit is from the secondary 52 through conductor 147, contact 123, relay blade 121 direct to motor winding 54, with return through conductor 57. The motor winding 55 is supplied with a leading current through capacitor 56 to establish motor rotation in one direction, for example, clockwise to rotate the antenna 59 to the desired position. Also, the potentiometer 67, which is shown to have its selectively adjustable blade driven by motor 46, will adjust the resistance of the second bridge arm towards a rebalancing condition. Upon rebalance of the bridge, the ouput voltage thereof decreases to a null, whereupon relay 120 is deenergized. This deenergization results in the return of relay blades 121 and 122 to their normal contacts 123 and 125, respectively, to accordingly deenergize transforemr 47 and stops the motor 46 at the desired position.

On the other hand, if potentiometer 66 had been rotated counterclockwise, as shown by the arrow 97, the bridge output voltage, as established across the terminals 63 and 65, would be unbalanced in the opposite phase from that initially outlined hereinbefore. This is shown in the right half of FIGS. 5–A to 5–D, with the bridge output signal 92 being in phase with the reference voltage 91 from terminals 62 to 61. On the second half cycle of the alternating voltage no current is supplied by the transistor 75 because its base is being driven positive to result in a cutting off of conduction thereof. However, during the first half cycle, as the input signal swings positive, there results a positive going signal on the base 107 and, hence, a negative signal on the base 76 of transistor 75 to cause conduction through transistor 75. This transistor output current flows from the emitter 77 to collector 78 through conductors 80 and 85, the coil of relay 130, and now since point 62 of secondary 53 is being pulsed with a negative going voltage diode 84 will be in a forward conducting state, whereas point 61 will have applied thereto a positive going signal to result in a cutting off of diode 83, and therefore the current flow will flow through diode 84 to the source terminal 62. This results in an energization of relay 130 with capacitor 88 keeping the contacts thereof closed. Accordingly, the energization of relay 130 pulls in relay blade 132 for energization of primary 49. Also, relay blade 131 engages contact 133 for a direct energization of motor winding 55 and leading current energization to motor winding 54. This establishes the opposite directional rotation of motor 46, for example, counterclockwise, and rotates the antenna 59 in the desired position. The driving of motor 46 also results in a repositioning of the selectively positionable blade of potentiometer 67 towards a rebalancing of the bridge circuit 48. Upon this rebalacing condition being attained, relay 130 is deenergized by lack of sufficient current through transistor 75 and the entire circuit is deenergized upon opening of blade 132 from contact 135.

Accordingly, from the hereinbefore description, it can be seen that the input may have two different phase conditions. With the first phase condition, the input only energizes relay 120, and with the input being of the second phase condition only relay 130 is energized. Accordingly, this differing phase condition on the input terminals 63 and 65 establishes selective energization of first and second relay means and establishes selective bi-directional rotation of the motor 46. Furthermore, it can be seen that in order to determine which path will be selected it is necessary that a comparison of the phase of the input signal as developed across terminals 63 and 65 be compared with the phase of the alternating current developed across secondary 53. In order to achieve this comparison, it was necessary to utilize transistors 103 and 75, and diodes 83 and 84. It having been established that depending upon the phase of the input signal as amplified by transistor 103, a biasing potential would be applied to the base of transistor 75. However, selective paths through either relay 120 or 130 would be established in accordance with the enabling or disabling voltage applied to the cathodes of diodes 83 and 84. It can, accordingly, be seen that a plurality of parts and resulting complexity in the wiring therebetween was necessary.

Now, turning to the simplified version of FIG. 4, simplification being a direct result of the utilization of my new phase sensitive circuit element, it can be seen that a considerable saving in parts and wiring results. In order to conserve on time and space, and further to avoid unneedlessly burdening the reader, I have labeled corresponding parts in FIGS. 3 and 4 identically. Furthermore, the parts so labeled will operate in the manner as described hereinbefore, and accordingly, for the most part, the circuit description of FIG. 3 will apply to FIG. 4. Therefore, FIG. 4 shows a phasesensitive circuit 114 used to control a motor 46. The circuit of FIG. 4 includes, generally, a transformer 47 energizing the motor 46, and additionally bridge circuit 48 and an amplifier circuit 116 supplies selective control therefor. The transformer 47 has a primary 49 energized from an alternating voltage source 50 through a switching arrangement, as described in FIG. 3. The transformer has first and second secondaries 52 and 53 with the first secondary 52 energizing a pilot lamp 58, and connected to energize motor windings 54 and 55 in the manner as described in connection with FIG. 3. Also, as described hereinbefore, the bridge circuit 48 is made up of a first bridge arm 64, a second bridge arm including variable resistors 66 and 67, a third bridge arm made up of one half of the secondary winding 53, and a fourth bridge arm being made up of the other half of the secondary winding 53. The output terminals of the bridge being made of terminals 63 and 65. Furthermore, similar to the circuit hereinbefore described in FIG. 3, a preamplification transistor 103 is connected between the bridge output terminals 63 and 65. However, it should be noted that in this case the preamplification transistor is of opposite conductivity type than that of FIG. 3. Accordingly, in order to properly bias transistor 103, a diode 60 is provided for half wave rectification of the alternating signal developed across secondary winding 53. During the portions of the alternating current cycle, when point 61 is positive with respect to point 62, diode 60 will conduct to result in an accumulation of a charge across condenser 99, with point 98 being charged positively with respect to neutral point 63. The size of condenser 99 should be judicially selected to provide the proper storage of a charge for the energization of transistor 103. Furthermore, the emitter 106 of transistor 103 is shown to be connected to secondary midpoint 63 and a leakage resistor 82 is shown connecting the base 105 to point 98. Lastly, a load resistor 102 is shown to connect collector 107 of transistor 103 to the positive bias point 98. Accordingly, any signal developed across the transistor will be reflected across resistor 102. The output as produced by resistor 102 is coupled by coupling condenser 101 to the P-type zone 150 of my four-layer element 149. Furthermore, N-type zone 151 is connected by lead 79 to secondary mid-point 63. A biasing resistor 109 connects N-type zone 151 to P-type zone 150. Furthermore, as shown in FIG. 4 the split outer layer of my four-layer device, zones 152 and 153, are shown to be connected respectively by way of relays 120 and 130 to points 61 and 62. The wave forms shown in FIG. 6–A are shown for reader reference, and to explain the operation of FIG. 4. Accordingly, let us assume that knob 112 is turned in a direction which results in a clockwise movement of the blade of selectively adjustable means 66, by way of lost motion device 110. The manual movement of knob 112, as explained hereinbefore, results in a closing of switch 140 and an energization of transformer 47. Looking at the wave forms shown in FIGS. 6–A through 6–D, FIG. 6–A representthe voltage at point 61 relative to point 62, and FIG. 6–B representing the error signal across terminals 63 through 65 for these conditions, it can be seen that transistor 103 will be responsive to the first half cycle of the wave form to result in an increase of current flow through resistor 102. This increase of current through resistor 102 is coupled by way of coupling condenser 101 to the P-type zone 150, the emitter of unit 149, for forward biasing thereof. Accordingly, depending upon which of the terminals, 61 or 62, is in a positive direction concurrently therewith will establish which of the two relays, 120 or 130, will be energized. In this case, since we have assumed that point 61 is being pulsed positively concurrently with the pulsing of emitter 150, it is seen that a positive potential will be applied by way of relay coil 120 to the split P zone 152 for establishment of forward conduction thereof. Therefore, under the conditions as outline above, a signal shown in FIG. 6–D will be passed through relay coil 120 and lead 81 back to terminal 61 of secondary winding 53. Condenser 87 is shown to be connected across relay coil 120, and performs the same functions as outline hereinbefore, namely, to prevent chatter of the relay contacts. However, since terminal 62 is negative at the time that P zone 150 is being injected with current, for increase of the four-layer device's alpha, it follows that no current flow will be flowing through anode 153, and accordingly relay 130 will remain deenergized. The energization of relay 120 results in a pull in of the relay blades 121 and 122 against contacts 123 and 125, respectively. The closing of lead 122 against contact 125 establishes an energization circuit for the primary 49 through conductor 141, relay blade 132, relay blade 122, contact 125, conductor 139 to the primary 49 and return through conductor 138. Also, the closing of relay blade 121 against contact 123 establishes an energization circuit for the motor 46 by way of secondary 52. This energization circuit is from the secondary 52 through conductor 147, contact 123, relay blade 121, directly to motor winding 54, with return through conductor 57. The motor winding 55 is supplied with a lead current through capacitor 56 to establish motor rotation in one direction, for example, clockwise, to rotate the antenna 59 to the desired position. Also, as shown, the selectively positionable blade of potentiometer 67 is connected to motor 46 for movement therewith. Therefore, as motor 46 rotates the antenna it will also move the selectively positionable blade of 47 in a rebalancing direction. Upon rebalancing of the bridge, the output voltage of this bridge decreases to a null, whereupon relay 120 is deenergized. This deenergizes the transformer 47 and accordingly stops motor 12 at the desired position.

Figures 5A, 5B, 5C, 5D, 6A, 6B, 6C, 6D:
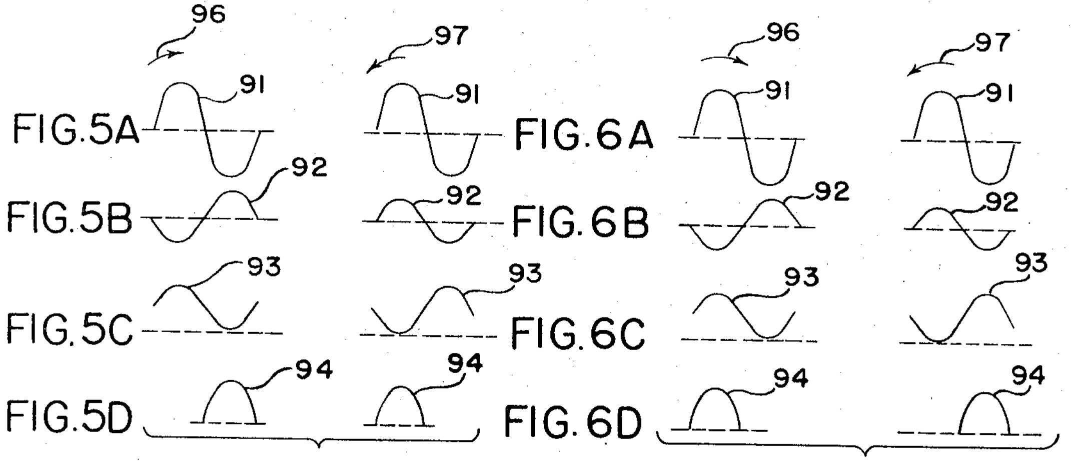
FIGS. 5A–5D are a series of electrical wave forms explaining the operation of FIG. 3.
FIGS. 6A–6D are a series of electrical wave forms explaining the operation of FIG. 4.

If the selectively movable blade of potentiometer 66 is moved in a counterclockwise direction, as shown by the arrow 97, resulting in the FIGS. 6–A through 6–D wave forms, the bridge output voltage will be unbalanced in the opposite phase condition from that outlined hereinbefore. Thus, as shown in the right half of FIGS. 6–A through 6–D, the bridge output signal 92 will be in phase with the reference voltage 91 established across terminals 62 to 61. Therefore, as the error signal on the first half of the cycle goes positive transistor 103 will be responsive thereto to result in a decrease of signal across resistor 102. This decrease of signal, a negative going signal, is coupled by way of coupling condenser 101 to the emitter 150 of element 149. This results in a decrease in current being injected into the P-zone 150 and therefore does not increase the alpha of my four-layer device. However, on the next half of the cycle, the base of transistor 103 will be going negative to result in an increase in current flow through output resistor 102. This increase in current through resistor 102 results in a positive signal being supplied to the P zone region 150. Accordingly, as current is injected into emitter 150 the alpha of my four-layer device will increase. At the same time that current is being injected into emitter 150, the split P zone 153 is being supplied with a positive half cycle of voltage from terminal 62 by way of relay coil 130. Accordingly, since the emitter 150 is being injected with a current concurrently with collector 153 being pulsed in a positive direction, current will be flowing through the circuit connected to collector 153. Of course, at the same time, collector 152 is being pulsed with a negative voltage and accordingly no current will be flowing through the circuit connected to collector 152. Therefore, the current flow through collector 153 results in an energization of relay coil 130. Capacitor 88 is used to keep the contacts closed for alternate half cycles of current flow through relay coil 130. Energization of relay coil 130 pulls in relay blade 132 for energization of the primary 49. Also, relay blade 131 engages contact 133 for a direct energization of motor winding 55 and a leading current energization for motor winding 44. This establishes the opposite directional rotation of motor 46, for example, counterclockwise. In accordance with the current flow through the motor windings, the antenna 59 will be rotated to the desired position. As shown, the selectively positionable blade of potentiometer 67 is coupled to motor 46 for movement in accordance with the rotation of motor 46. Upon the bridge being rebalanced, by the adjustment of the blade of potentiometer 67, relay 130 is deenergized, because of the lack of sufficient current through my novel switching element 149, to result in the entire circuit being deenergized.

It will accordingly be noted that the circuit of FIG. 4 results in first and second load conditions, established by the phase of the bridge error signal relative to the reference voltage source developed across points 63 and 65. In one phase condition, relay 120 is energized and in the other phase condition relay 130 is energized. Thus, this differing phase condition on the input establishes a selective energization of first and second relay means and establishes selective bi-directional rotation of the motor 46. Furthermore, it can be seen that the use of my four-layer device in the circuitry of FIG. 4 has achieved the same operational functions as the more complex circuitry of FIG. 3 with the elimination of transistor 75, diodes 83 and 84, and the necessary connections therebetween.

While it will be apparent that the embodiment of my novel switching element herein disclosed is well calculated to fulfill the objects of the invention, it will be appreciated that the invention is susceptible to modification, variation and change and for use in a variety of switching applications without departing from the proper scope or fair meaning of the appending claims.

I claim:

1. A phase sensitive switching element for controlling the path of electric current in accordance with the phase of a gating signal relative to the phase of a controlling alternating signal comprising: a first zone of material having a first conductivity type, second and third zones of material of conductivity type opposite from that of said first zone formed contiguously to the outer surfaces of said first zone, the contiguous portions forming junctions between each of said second and third zones and said first zone, fourth and fifth zones of material having the same conductivity as said first zone formed on the outer surface of said second zone of material the contiguous portions forming junctions between said fourth and fifth zones and said second zone, said fourth and fifth zone being spatially removed from each other, connecting means for applying a biasing potential to said third zone of material, means for applying a variable phase signal to said first zone, and means for concurrently applying control signals of opposite phase to said fourth and fifth zones.

2. A phase sensitive switching element comprising: a silicon body having zones arranged in successive, contiguous fashion, alternate zones being of opposite conductivity type and forming junctions therebetween, one of the outer zones being divided along a line intermediate its ends forming two spaced apart sections, means for applying a biasing voltage to the undivided outer zone, means for connecting and initiating current into the zone of said body immediately adjacent said undivided outer zone for increasing the effective alpha of the body, and means for concurrently applying signals of opposite phase to said divided sections and thereby controlling the current flow through said split section currently receiving a properly phased signal.

3. A phase sensitive switching element comprising: a silicon body having four layers arranged in successive, contiguous fashion with alternate layers being of opposite conductivity type forming a junction between each adjacent pair of layers of opposite conductivity, one of the outer layers of said body being split into two physically independent zones, said body normally having a low effective alpha, and connecting means for applying and initiating current to one of said layers for increasing the effective body alpha, and means for applying oppositely phased voltages concurrently to said physically independent zones for controlling the current flow therethrough to the one of said physically independent zones having a properly phased voltage applied thereto and for reducing the sustaining voltage across the previously conducting zone thereof.

4. A phase sensitive switching element for controlling the path of electric current therethrough in accordance with the phase of a gating signal relative to the phase of a controlling alternating signal comprising: a body of semi-conductive material having four successive alternate zones of opposite conductivity and rectifying junctions between each pair of successive alternate zones, and having one of its outer zones divided to form two physically separated sections, connecting means for applying a biasing potential to a first undivided zone of material, means for applying a variable phase signal to a second undivided zone of said body, and means for concurrently applying control signals of opposite phase to said bisected outer zones in such a manner that current flows through said body from one of said divided zones, said one zone being forwardly biased relative to said biasing potential while conductive.

5. A phase sensitive switching element comprising: a silicon body having a successive, contiguous layers, wherein alternate layers thereof are of opposite conductivity type and form junctions therebetween, one of the outer layers of said body being split into two physically independent zones, said body normally having a low effective alpha, and connecting means for applying and initiating current to said layer for increasing the effective body alpha, and means for applying oppositely phased voltages concurrently to said split zones for controlling current flow therethrough to the one of said split zones having a properly phased voltage applied thereto and for simultaneously reducing the sustaining voltage across the other split zones to below the critical level thereby to effect a cut-off of current flow through said other zone.

6. A phase sensitive switching element comprising: a silicon body having four zones arranged in successive, contiguous fashion, alternate zones being of opposite conductivity type and having a junction therebetween, one of the outer zones being bisected along a line intermediate its ends formed two spaced apart sections, means for applying a biasing voltage to the unbisected outer zone, means for connecting and initiating current into the zone of said body immediately adjacent said last mentioned zone for increasing the effective alpha of the body, and means for concurrently applying signals of opposite phase to said split outer sections and thereby controlling the current flow through said split section currently receiving a properly phased signal.

(References on following page)

References Cited by the Examiner

UNITED STATES PATENTS

| | | | |
|---|---|---|---|
| 2,910,634 | 10/1959 | Rutz | 307—88.5 |
| 2,967,793 | 1/1961 | Philips | 317—235 |
| 3,134,026 | 5/1964 | Earle | 307—88.5 |
| 3,162,770 | 12/1964 | Rutz | 317—235 |
| 3,201,596 | 8/1965 | Longini | 307—88.5 |
| 3,237,018 | 2/1966 | Leger | 317—235 |

ARTHUR GAUSS, *Primary Examiner.*

R. H. EPSTEIN, *Assistant Examiner.*